(12) United States Patent
Haggard

(10) Patent No.: US 6,569,328 B1
(45) Date of Patent: May 27, 2003

(54) UNDERDRAIN FILTRATION SYSTEM WITH STAMPED PERFORATIONS

(76) Inventor: Gary D. Haggard, 12603 Velarde Cove, Austin, TX (US) 78729

( * ) Notice: Subject to any disclaimer, the term of this patent is extended or adjusted under 35 U.S.C. 154(b) by 79 days.

(21) Appl. No.: 09/705,458

(22) Filed: Nov. 2, 2000

(51) Int. Cl.⁷ .............................................. B01D 24/46
(52) U.S. Cl. ..................................... 210/275; 210/293
(58) Field of Search ........................... 29/896.6, 896.62, 29/902; 210/274, 275, 293, 289, 291

(56) References Cited

U.S. PATENT DOCUMENTS

| | | | | |
|---|---|---|---|---|
| 3,762,559 A | * | 10/1973 | Knoy et al. .................. | 210/293 |
| 4,331,542 A | * | 5/1982 | Emrie ......................... | 210/274 |
| 5,019,259 A | * | 5/1991 | Hambley ..................... | 210/275 |
| 6,090,284 A | * | 7/2000 | Melber et al. ............... | 210/293 |

* cited by examiner

Primary Examiner—Ivars Cintins
(74) Attorney, Agent, or Firm—Thomas M. Freiburger

(57) ABSTRACT

An underdrain filtration system has improved perforation structure, the perforations being positioned to admit the filtrate into a plenum defined by elongated underdrain rib structures of the system. Instead of drilled or laser-cut holes or slits, the slits are formed by stamping discs from the stainless steel plate, such that the discs extend parallel to the surrounding flat area but are raised just sufficiently to define a plurality of slits under each disc, preferably two to four slits, each being an arc of slightly less than 180°, 120° or 90°, respectively. A pair of metal bridges remain to integrally connect the raised disc and the surrounding flat field. Consistent perforation width is achieved, at, for example, 0.010" width varying by less than 0.001" in either direction, improving consistency of pressure drop. In addition, the raised discs during backflushing of the underdrain create an outwardly diverging water flow pattern which is beneficial in clearing trapped particles from the filter medium in the vicinity of the underdrain perforations.

7 Claims, 5 Drawing Sheets

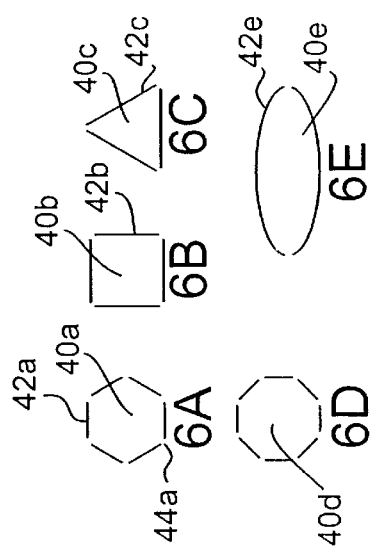
(FIG. 6)
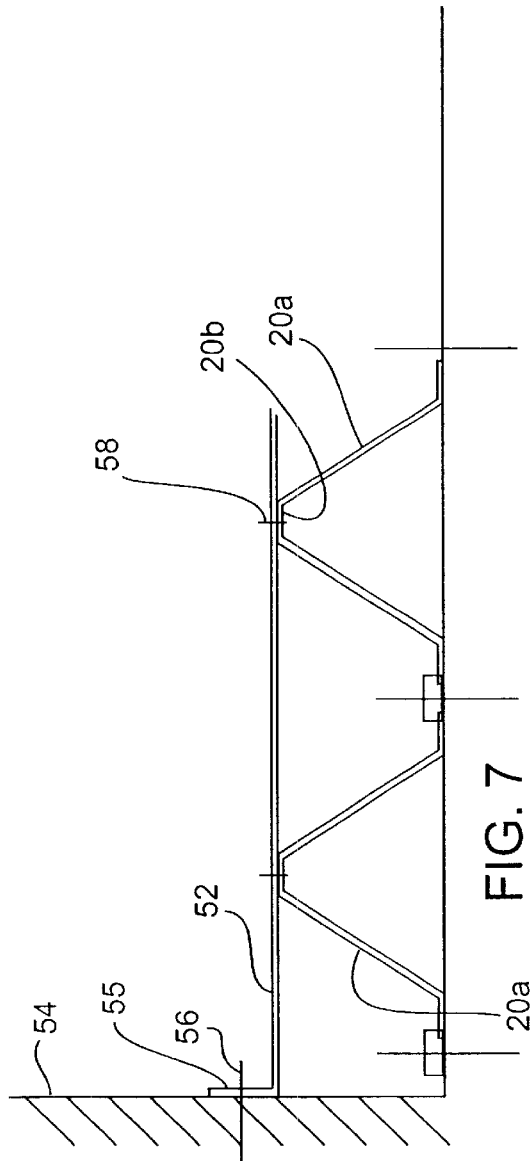
FIG. 7

UNDERDRAIN FILTRATION SYSTEM WITH STAMPED PERFORATIONS

BACKGROUND OF THE INVENTION

This invention concerns underdrain filtration systems for water purification or sewage treatment systems which employ a filtering medium of stacked granular material retained above a tank floor by perforated metal underdrain structures. More particularly, the invention is concerned with an improvement whereby the perforations in the metal underdrain structures supporting the granular material are formed in an efficient manner so as to establish a high rate of consistency among the opening sizes, as well as promoting a better fluid flow pattern during backflushing.

An example of an underdrain filtration system is shown in application Ser. No. 09/170,870, U.S. Pat. No. 6,090,284. As pointed out in that application and patent, such granular filtration systems typically have corrugated or undulating-shaped perforated underdrain structures, and the systems are equipped to backwash the granular material covering the underdrain units by water, and usually by air from an adjacent source. The assignee's U.S. Pat. No. 4,331,542 also describes an underdrain structure for use with such gravity-fed granular filtration systems, fitted with water backflushing and air scouring.

As explained in those patents, the subject high rate gravity filters usually have filter beds with gravel of varying sizes. Liquid from the tank or vessel flows downwardly by gravity through the filter medium and exits the filtration tank through openings in the underdrain structures that support the granular filtration medium. Typically the coarsest gravel of the medium is at the bottom, against the underdrain structure, with the gravel decreasing in size up to the finest gravel or sand, located at the top of the filter bed. Some filter beds are all sand, and the bed may be covered with finely granulated anthracite coal or other types of filter material.

Backwashing and air scouring are important aspects of these types of gravity filters, for cleaning the filters against clogging. Water or a combination of air (or gas) and water is passed up through the filter bed, in the opposite direction of normal filtration. Air may be from a tube adjacent to the underdrain structures. Uniform distribution of the backwashing fluids is a goal of most underdrain structures. This includes the systems described in the above-referenced patents, as well as some of the underdrain systems of the following patents: U.S. Nos. 4,659,462, 4,707,257, 5,015,383, 5,019,259, 5,156,738, 5,160,614, 5,269,920, 5,332,497, 5,462,664, 5,489,388, 5,512,174, 5,639,384.

Application Ser. No. 09/170,870, U.S. Pat. No. 6,090,284, shows an embodiment of an underdrain structure wherein the water-passing perforations are in the form of narrow slits, small enough to support a bed of sand without allowing the sand to pass through the openings. Slit openings were made by laser cutting, as opposed to an earlier practice of forming the openings as 3/16" diameter holes, over which gravel was placed.

The consistency of the opening sizes is important for proper water distribution in backflushing and balancing of pressure drop across the entire underdrain structure. Laser cutting is fairly expensive and has typically not been capable of providing a highly consistent range of opening width. The openings formed by laser cuts in the experience of the applicant ranged from about 0.008" to 0.012", a variation of 0.002" in both directions from the target size of 0.010". The resulting differences in pressure drop tended to cause inefficiency in the action of the backwashing water in cleaning the surrounding filter medium. Moreover, even if these slots could be formed perfectly at the target width, the slots would not provide an optimum pattern of pressurized backwash water flow for filter cleaning, as does the system of the invention described below.

SUMMARY OF THE INVENTION

The invention is an improvement in the fabrication and performance of the filter media-retaining underdrain. Instead of round holes or laser-cut slots, the invention utilizes a machine punch process to produce fine openings in a metal plate of specific thickness gauge, resulting in openings of a very consistent width. In one embodiment the openings are 0.010" in width and sufficiently small and consistent to directly retain a filter medium (sand) ranging from 0.3 mm to 0.5 mm. The punched plate preferably is then folded into a trapezoidal shape such as shown in the above-referenced U.S. Pat. Nos. 4,331,542 and 6,090,284. The trapezoidal underdrain structure defines a conduit for carrying filtered water or wash water in a municipal water treatment filter or tertiary treatment in a municipal waste water treatment filter.

The stampings preferably are circular in shape, although they could be other curved shapes or polygonal, and produce a plurality of slots which lie generally in a circuit defined by the space between a raised disc and the surrounding flat area of the underdrain material. In one preferred embodiment the raised discs are circular, with two to four bridges between ends of adjacent slits, these metal bridges being left remaining from the stamping of the discs. Two such bridges between two arcuate slots are generally sufficient, but three bridges will provide more stability of the aperture sizes in the event of rough handling or other forces experienced during transportation, installation and use.

A very highly consistent slit width can be formed in this way, varying less than 0.001" in either direction, and thereby improving consistency of pressure drop throughout the underdrain. As a result of the small and consistent dimensions achievable with the process of the invention, underdrain structures can support the sand filter medium directly on the underdrain plates, thus eliminating the space normally required for progressively smaller gravel layers positioned over the underdrain to support the sand above, as in previous implementations.

A further benefit of the stamped-disc orifices is that the raised discs during backflushing through the underdrain create an outwardly diverging water flow pattern beneficial in clearing trapped particles from the filter medium in the vicinity of the underdrain apertures.

Tests were performed on underdrain sections formed according to the invention were tested for pressure loss. The pressure loss was found to be much lower than head loss through underdrain structures with laser-cut slots of the same total area of openings. This is due to the consistency of the openings and the lack of irregularity along the edges of the slots which are encountered with laser-cut slots.

It is thus among the objects of the invention to improve the structure, manufacturing procedure and cost of metal underdrains for granular filter beds, through use of a stamping process that forms raised discs in the metal structure, defining slits arranged generally in a circuit. These and other objects, advantages and features of the invention will be apparent from the following description of a preferred embodiment, considered along with the accompanying drawings.

DESCRIPTION OF THE DRAWINGS

FIGS. 6A to 6E are views showing other shapes which can be employed in the punching of the discs to form the slit apertures.

FIG. 7 is a schematic elevation view showing a plate used over an existing underdrain system to provide advantages of the invention.

DESCRIPTION OF PREFERRED EMBODIMENTS

Figure 1:
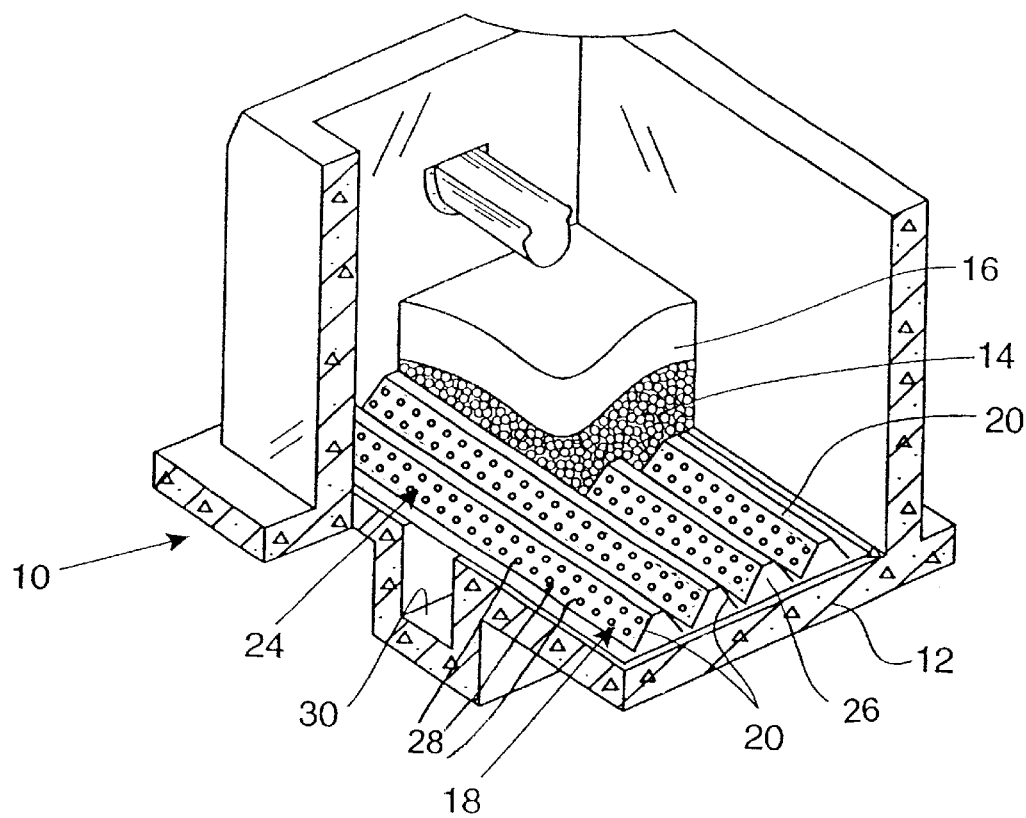
FIG. 1 is a perspective view showing a granular filtration system including an underdrain structure of the type to which this invention relates.

In the drawings, FIG. 1 shows in perspective major components of a liquid filtration system 10 partially in accordance with prior art and also in accordance with features of the invention to be described below. The filtration system is formed as part of a tank typically of concrete and having a floor 12. This is a system of the type described in U.S. Pat. No. 4,331,542, as well as some of the other patents referenced above. The filtration system, as described above and also in the '542 patent, has a bed of granular material 14 which may be topped with a layer of bituminous material 16. Supporting the granular bed 14 is a perforated surface 18 at the bottom of the tank, preferably a corrugated surface as shown and as described in the '542 patent. Such a surface preferably is formed of a series of perforated longitudinal ribs 20 which form triangular or trapezoidal cross-sectional shapes when placed against the floor 12.

Figure 5:
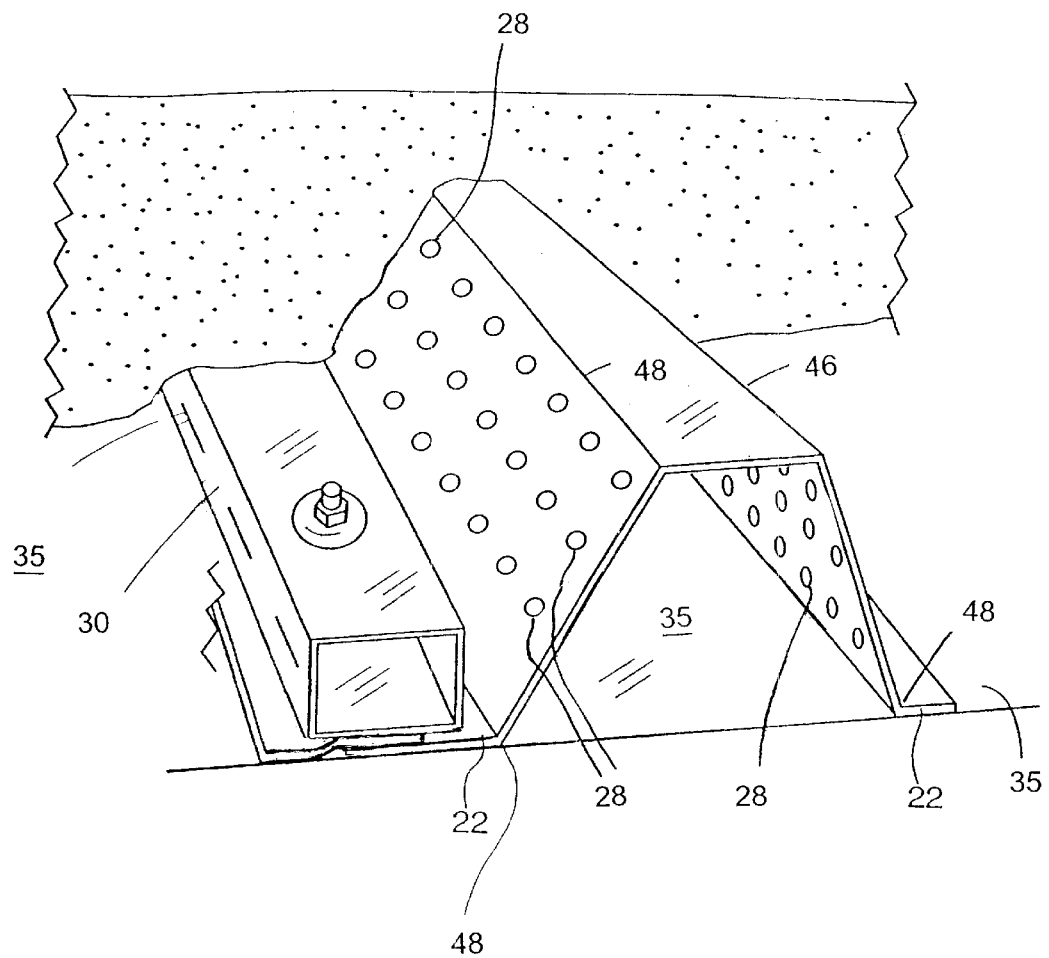
FIG. 5 is a perspective view showing an underdrain structure formed by bending a punched plate such as shown in FIG. 2.

In a preferred embodiment, as shown particularly in FIG. 5, each perforated longitudinal rib 20 preferably has a horizontal flange 22 at left and right extremities, these flanges of adjacent longitudinal ribs being slightly spaced apart in the completed underdrain unit 24, thus defining troughs of the corrugations which are partly constituted by the tank floor 12 itself. As explained in U.S. Pat. No. 4,331,542, the longitudinal ribs define inner spaces or chambers 26 which collect liquid filtrate passing through the granular bed 14 and through the multiplicity of perforations 28 in the ribs. This filtrate travels to and collects in a gutter or gullet 30 of the tank bottom.

As noted above, granular filtration systems and underdrain units of this general type are ordinarily equipped with liquid backwashing subsystems, and also pressurized air (or gas), sometimes called scouring air, which is delivered adjacent to the underdrain perforations and to the backwashing liquid to aid in the backwashing of debris from the filter bed. FIG. 5 shows a form of air scour subsystem wherein air is distributed through a tubular structural member 30 which has air distribution outlet holes or slits shown at 32. This tubular structural member 30 also serves to retain the underdrain structures 20 down against the tank floor 35, thus serving a dual purpose, as disclosed in the above referenced application Ser. No. 09/170,870, U.S. Pat. No. 6,090,284.

Figure 2:
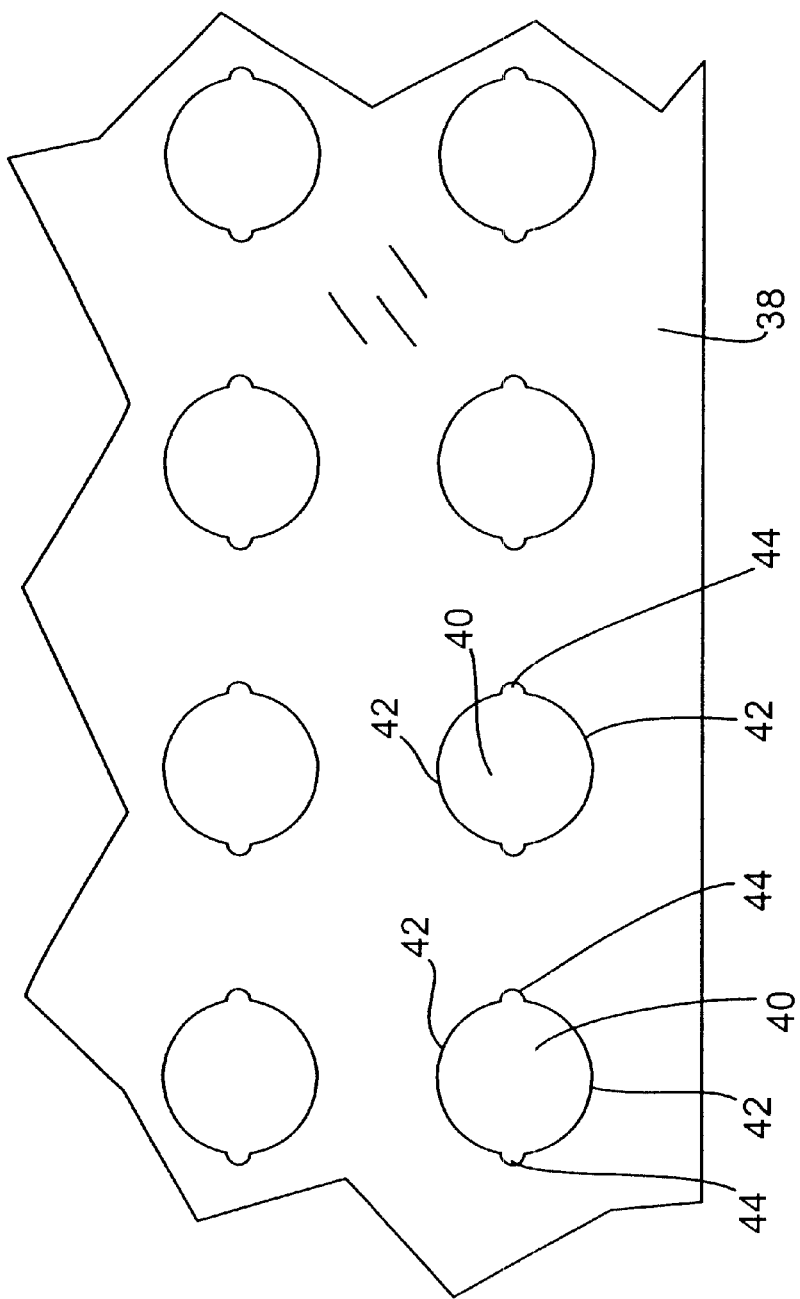
FIG. 2 is a view showing a flat metal plate punched or stamped to form raised discs and defining of slit openings in the plate, in accordance with the invention.
Figure 3:
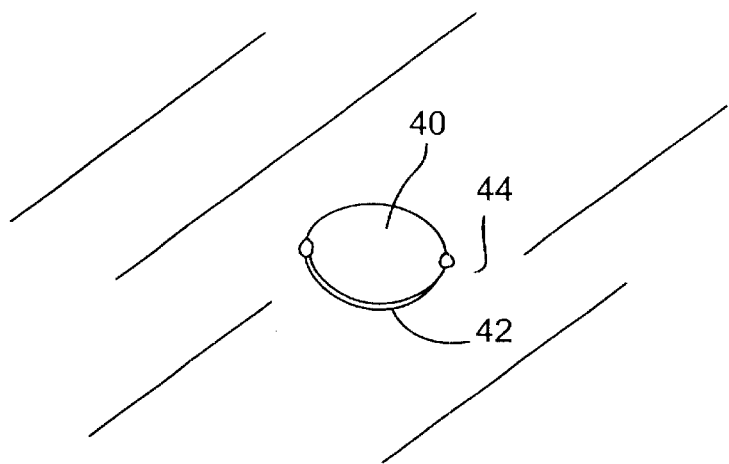
FIG. 3 is a perspective view showing a raised disc and resulting slit openings in greater detail.

FIG. 2 shows in flat plan view a sheet of metal 38, preferably stainless steel in a thickness of about 1.6 mm or slightly under 1/16", from which the perforations or apertures 28 are formed in accordance with the invention. FIGS. 2 and 3 show that in one embodiment, the apertures are formed by a stamping process, as by a punch press which stamps or punches out raised discs 40 from the flat sheet of material 38. The raised discs 40 formed in accordance with this embodiment are generally circular, with diameters which may be approximately 3/8" to 1". The discs are punched to a controlled depth which opens slits 42 between the disc and the surrounding flat field of metal, and these slits are highly consistent in width. A preferred width for this embodiment is about 0.010".

The discs 40 are stably and rigidly retained on the flat metal sheet 38 by metal bridges 44 which are left remaining in the stamping process. The stamping die is shaped so as to leave these metal bridges 44 and is precisely formed to result in highly consistently-sized slits 42 serving as perforations for passage of filtrate. With the consistently formed openings in sizes of about 0.010" as is preferred for some applications, the granular material 14 can have sand piled directly on the underdrain structure formed from the sheet metal plate 38, and an intermediate bed of gravel in gradation of sizes can be eliminated. This can save up to about one foot of space in some types of filtration systems.

The metal stamping, a portion of which is shown in FIG. 2, is formed into an underdrain structure which preferably is trapezoidally shaped as shown in FIG. 5. The bending of the stamped metal, along bend lines 46 and 48, is done subsequent to the stamping of the apertures, in a preferred implementation of the method, since the stampings are more easily accomplished on a conventional press when the metal piece is in completely flat form. However, a special stamping die could be provided to punch the discs after bending of the plate.

Figure 4:
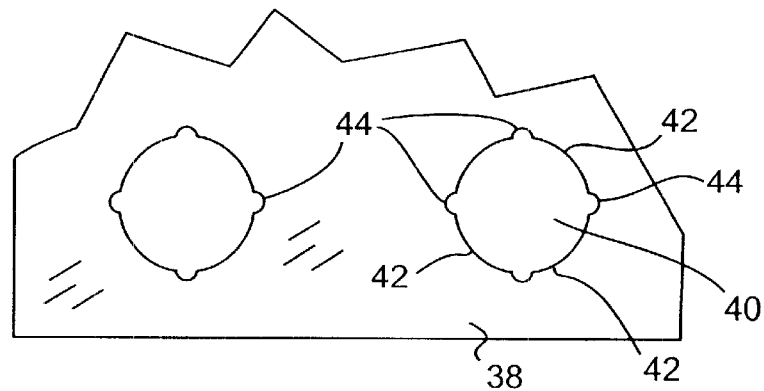
FIG. 4 is a view similar to FIG. 2, showing a variation.

FIGS. 2 and 3 show stampings which form raised discs 40 connected by two opposed metal bridges 44. However, as discussed above, these bridges can be greater in number, such as three or four around a circuit of slits, so as to assure a more secure, rigid and stable connection between the raised discs and the surrounding flat metal area. Thus, in another preferred embodiment three equally spaced bridges are left remaining from the stamping process, thus providing three arcuate slits which are spaced apart 120° and which are separated by the bridges. FIG. 4 shows an embodiment wherein raised discs 40 are retained to the surrounding metal plate 38 with four such metal bridges 44. Thus, four arcuate slits or punched slots 42 are formed as filtrate apertures, separated by the bridges 44. However, three such bridges are generally sufficient.

Although FIGS. 2, 3 and 4 show aperture slits 42 in a circular pattern, with circular raised discs 40 formed in the stamping process, the circuit of slits and the shape of the disc need not be circular. It is sufficient that the slits be arranged in some form of circuit, the slits being separated by bridges, such that a raised disc of any practical shape is formed in the punching or stamping operation. A circle is an efficient shape, but FIGS. 6A–6E shows other shapes, as examples, which can be employed. FIG. 6A shows schematically a series of six slits 42a in a hexagonal pattern, with bridges 44a between adjacent slits. Thus, a hexagonal raised disc 40a is formed. FIG. 6B shows a square raised disc 40b, with a pattern of four slits 42b in a square arrangement, and this could be a non-square, rectangular arrangement.

FIGS. 6C, 6D and 6E show other shapes, including a triangular raised disc 40c, with three slits 42c in a triangular pattern; an octagonal arrangement in FIG. 6D, with an octagonal raised disc 40d; and an oval or elliptical shape in FIG. 6E, with a pair of slit apertures 42e defined between the surrounding flat metal and a raised oval disc 40e. Only two slits 42e are shown at FIG. 6E, but there could be three or four slits.

FIG. 7 shows schematically another application for the punched slot openings formed in accordance with the invention. The drawing shows existing underdrain structures 20a as implemented prior to the invention, and these typically have 3/16" diameter holes for the filtrate. As noted above, these require a support gravel system above the underdrain structure, for supporting the fine granule filter medium such as sand. These existing underdrain systems can be fitted with a flat plate 52 placed across the tops of and supported by the flat top portions 20b of the existing underdrain plates or structures 20a. This eliminates the need for a support gravel bed above the underdrain structures, increasing the vertical height available for the actual filter medium by about 12", and thus improving the filtering capability of the existing filter.

The plate 52 has punched openings as described above (not shown in FIG. 7). By leaving the existing underdrain structure 20a in place, the illustrated arrangement makes this filter improvement very inexpensive. The flat plates 52 can be attached to side walls 54 of the filter system via an angled bend 55 in the plate, with stainless steel anchors 56 as shown, and attached to the tops of the existing underdrain structures 20a with stainless steel machine screws indicated at 58. Other methods of securing can be used. Filter sand or anthracite can be placed directly on top of the flat plates 52 with their very fine, preferably 0.010" punched openings. Because the plates 52 lie flat, they need to be somewhat thicker than the folded plates forming the underdrain structures 20 described above, in order to support the filter medium and withstand the forces generated by a high rate backwash without permanent deforming.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. In an underdrain filtration system which includes metal underdrains comprising a series of elongated perforated metal rib structures fixed against a floor and formed by bending so as to extend upwardly from the floor to define a filtrate plenum between the elongated rib and the floor, into which filtered liquid flows after passing through a bed of filtration media and through the perforations in the elongated rib structure, the improvement comprising:

a series of stampings in the metal rib structure forming the perforations, which comprise slits positioned in arrays so that a plurality of such slits generally form a circuit, such that at each array a raised disc extends out from a surrounding flat area of the underdrain rib structure, the raised disc being integrally connected to the surrounding flat area by metal bridges positioned between ends of adjacent slits and which are left remaining from the stamping of the discs, and the slits defining said perforations in consistent width dimensions from slit to slit and from array to array, whereby consistency in the perforation size assures proper and consistent pressure drop through the underdrain and proper balance of liquid flow during backflushing of the underdrain, and whereby the raised discs cause a diverging pattern of backwash liquid flowing out of the underdrain and through the filter media when the underdrain is backflushed.

2. The underdrain filtration system of claim 1, wherein the discs are connected to the surrounding flat area by two to four spaced apart metal bridges.

3. The underdrain filtration system of claim 1, wherein the slits each have a width of 0.010", plus or minus 0.001".

4. The underdrain filtration system of claim 1, in combination with sand as a filtration medium, the sand being positioned directly against the exterior of the elongated rib structures of the underdrain system, the perforation slits being smaller than the sand particles.

5. The underdrain filtration system of claim 1, wherein the raised discs are essentially circular in shape.

6. The underdrain filtration system of claim 5, wherein there are two to four said slits forming each array.

7. The underdrain filtration system of claim 6, wherein the raised discs are about 3/8 to 1 inch in diameter.

* * * * *